(12) United States Patent
Hietala et al.

(10) Patent No.: US 9,711,999 B2
(45) Date of Patent: Jul. 18, 2017

(54) ANTENNA ARRAY CALIBRATION FOR WIRELESS CHARGING

(71) Applicant: RF Micro Devices, Inc., Greensboro, NC (US)

(72) Inventors: Alexander Wayne Hietala, Phoenix, AZ (US); Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 90 days.

(21) Appl. No.: 14/851,642

(22) Filed: Sep. 11, 2015

(65) Prior Publication Data

US 2016/0087483 A1    Mar. 24, 2016

Related U.S. Application Data

(60) Provisional application No. 62/052,822, filed on Sep. 19, 2014.

(51) Int. Cl.
| | |
|---|---|
| *H02J 7/00* | (2006.01) |
| *H02J 50/10* | (2016.01) |
| *H02J 50/80* | (2016.01) |
| *H02J 50/23* | (2016.01) |

(52) U.S. Cl.
CPC .............. *H02J 50/10* (2016.02); *H02J 50/23* (2016.02); *H02J 50/80* (2016.02)

(58) Field of Classification Search
CPC ........ H02J 7/025; H02J 7/0027; H02J 7/0004; H02J 5/005; H02J 50/10; H02J 50/12; H02J 50/40

USPC .......................................................... 320/108
See application file for complete search history.

(56) References Cited

U.S. PATENT DOCUMENTS

| | | | | |
|---|---|---|---|---|
| 2010/0225272 A1* | 9/2010 | Kirby | ....................... | H04B 5/00 |
| | | | | 320/108 |
| 2011/0115432 A1* | 5/2011 | El-Maleh | ........... | G06Q 30/0267 |
| | | | | 320/108 |

* cited by examiner

*Primary Examiner* — Nghia Doan
(74) *Attorney, Agent, or Firm* — Withrow & Terranova, P.L.L.C.

(57) ABSTRACT

Antenna array calibration for wireless charging is disclosed. A wireless charging system is provided and configured to calibrate antenna elements in a wireless charging station based on a feedback signal provided by a wireless charging device. The antenna elements in the wireless charging station transmit wireless radio frequency (RF) charging signals to the wireless charging device. The wireless charging device provides the feedback signal to the wireless charging station to indicate total RF power in the wireless RF charging signals. The wireless charging station is configured to adjust transmitter phases associated with the antenna elements based on the feedback signal until the total RF power in the wireless RF charging signals is maximized. By calibrating the antenna elements based on the feedback signal, it is possible to achieve phase coherency among the antenna elements without requiring factory calibration.

20 Claims, 6 Drawing Sheets

ANTENNA ARRAY CALIBRATION FOR WIRELESS CHARGING

PRIORITY APPLICATIONS

This application claims the benefit of U.S. provisional patent application No. 62/052,822, filed Sep. 19, 2014, which is incorporated herein by reference in its entirety.

This application is related to U.S. provisional patent application Nos. 62/024,621, filed Jul. 15, 2014; 62/024,628, filed Jul. 15, 2014; 62/051,023, filed Sep. 16, 2014; 62/052,517, filed Sep. 19, 2014; and 62/053,845, filed Sep. 23, 2014, which are incorporated herein by reference in their entireties.

FIELD OF THE DISCLOSURE

The technology of the disclosure relates generally to wireless charging of a battery.

BACKGROUND

Mobile communication devices have become increasingly common in current society. The prevalence of these mobile communication devices is driven in part by the many functions that are now enabled on such devices. Demand for such functions increases processing capability requirements for the mobile communication devices. As a result, increasingly complex integrated circuits (ICs) have been designed and manufactured to provide increasingly greater functionality in the mobile communication devices. However, the increasingly complex ICs also tend to consume more battery power during operation.

It has become more challenging to prolong battery life of the mobile communication devices in the face of continuing demand for higher processing speed, richer multimedia experience, and constant connectivity. As a result, the mobile communication devices are increasingly equipped with high-capacity batteries that are both expensive and space consuming. Even with the high-capacity batteries, the mobile communication devices often need to be plugged into the wall for recharging before the day is over.

SUMMARY

Aspects disclosed in the detailed description include antenna array calibration for wireless charging. In this regard, a wireless charging system is provided and configured to calibrate antenna elements in a wireless charging station based on a feedback signal provided by a wireless charging device. The antenna elements in the wireless charging station transmit wireless radio frequency (RF) charging signals to the wireless charging device. The wireless charging device provides the feedback signal to the wireless charging station to indicate total RF power in the wireless RF charging signals. The wireless charging station is configured to adjust transmitter phases associated with the antenna elements based on the feedback signal until the total RF power in the wireless RF charging signals is maximized. By calibrating the antenna elements based on the feedback signal, it is possible to achieve phase coherency among the antenna elements without requiring factory calibration.

In this regard, in one aspect, a wireless charging system is provided. The wireless charging system comprises a wireless charging station. The wireless charging station comprises a plurality of antenna elements configured to transmit a plurality of wireless RF charging signals, respectively. The wireless charging station also comprises a controller coupled to the plurality of antenna elements. The wireless charging system also comprises a wireless charging device. The wireless charging device is configured to communicate a feedback signal to the wireless charging station. The feedback signal indicates a total RF power received by the wireless charging device in the plurality of wireless RF charging signals.

For each antenna element among the plurality of antenna elements in the wireless charging station, the controller is configured to receive the feedback signal from the wireless charging device and record the total RF power indicated by the feedback signal as a first power parameter. For each antenna element, the controller is also configured to adjust the transmitter phase of the antenna element by the specified phase degree. For each antenna element, the controller is also configured to receive the feedback signal from the wireless charging device and record the total RF power indicated by the feedback signal as a second power parameter. While the second power parameter is greater than the first power parameter, the controller is configured to record the second power parameter as the first power parameter, adjust the transmitter phase of the antenna element by the specified phase degree, and receive the feedback signal from the wireless charging device and record the total RF power indicated by the feedback signal as the second power parameter.

In another aspect, a method for calibrating a plurality of antenna elements in a wireless charging station is disclosed. The method includes transmitting a plurality of wireless RF charging signals from a plurality of antenna elements. The method also includes communicating a feedback signal that indicates a total RF power received in the plurality of wireless RF charging signals.

For each antenna element among the plurality of antenna elements in a wireless charging station, the method includes receiving the feedback signal from the wireless charging device and recording the total RF power indicated by the feedback signal as a first power parameter. For each antenna element, the method also includes adjusting the transmitter phase of the antenna element by the specified phase degree. For each antenna element, the method also includes receiving the feedback signal from the wireless charging device and recording the total RF power indicated by the feedback signal as a second power parameter. While the second power parameter is greater than the first power parameter, the method includes recording the second power parameter as the first power parameter, adjusting the transmitter phase of the antenna element by the specified phase degree, and receiving the feedback signal from the wireless charging device and recording the total RF power indicated by the feedback signal as the second power parameter.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Aspects disclosed in the detailed description include antenna array calibration for wireless charging. In this regard, a wireless charging system is provided and configured to calibrate antenna elements in a wireless charging station based on a feedback signal provided by a wireless charging device. The antenna elements in the wireless charging station transmit wireless radio frequency (RF) charging signals to the wireless charging device. The wireless charging device provides the feedback signal to the wireless charging station to indicate total RF power in the wireless RF charging signals. The wireless charging station is configured to adjust transmitter phases associated with the antenna elements based on the feedback signal until the total RF power in the wireless RF charging signals is maximized. By calibrating the antenna elements based on the feedback signal, it is possible to achieve phase coherency among the antenna elements without requiring factory calibration.

Figure 1A:
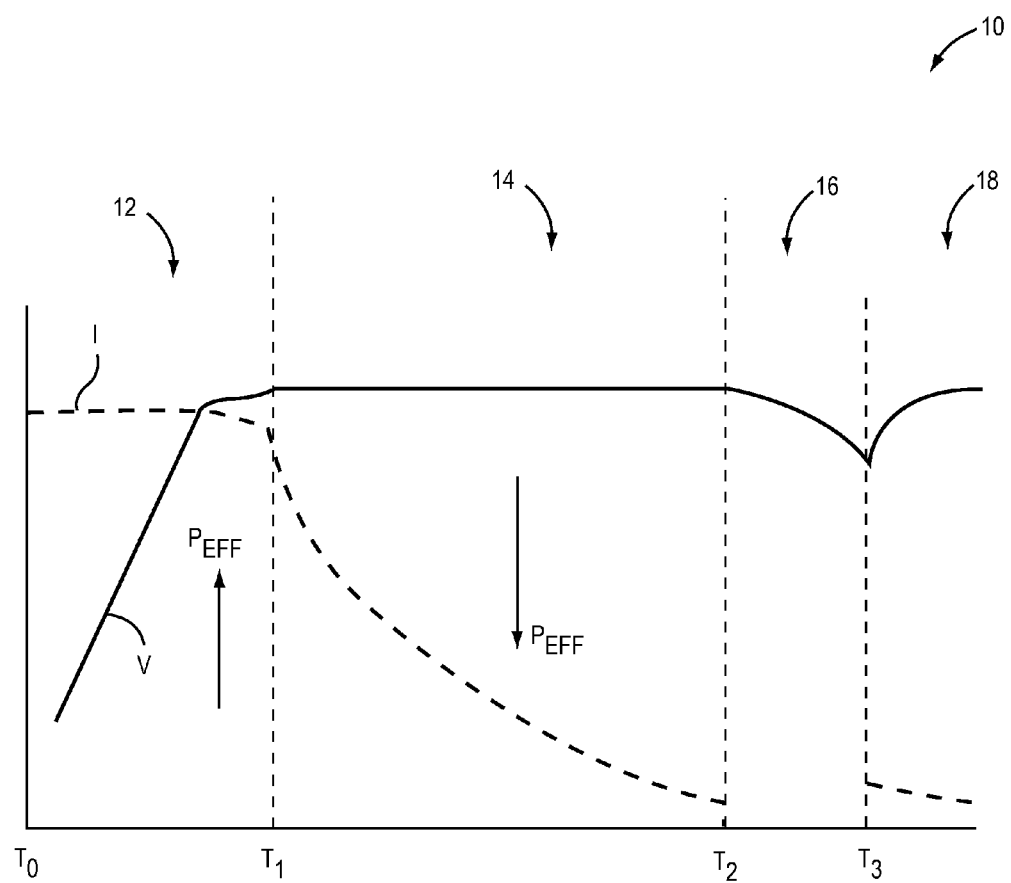
FIG. 1A is an exemplary illustration of a lithium-ion (Li-ion) battery charging profile.
Figure 1B:
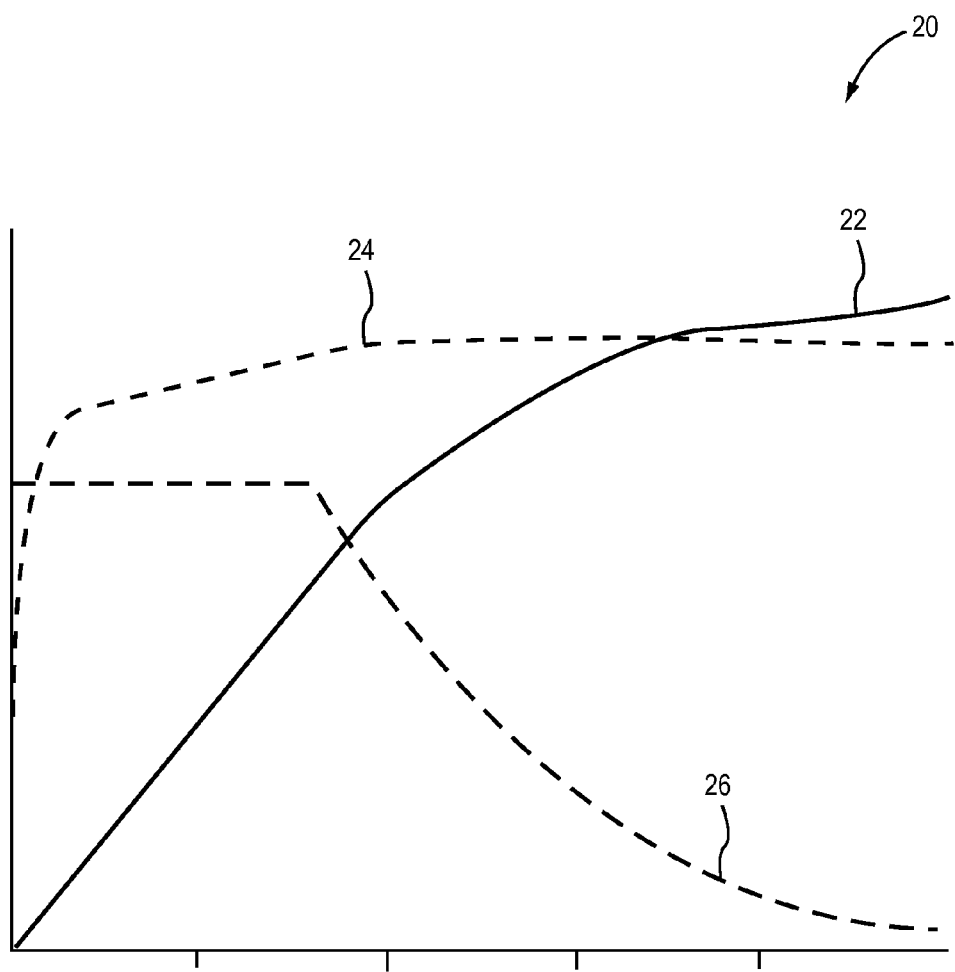
FIG. 1B is a capacity-voltage curve providing an exemplary illustration of Li-ion battery capacity as a function of a charging voltage and a charging current.

Before discussing the wireless charging concepts of the present disclosure, a brief overview of a lithium-ion (Li-ion) battery charging profile is provided with reference to FIGS. 1A and 1B. The discussion of specific exemplary aspects of antenna array calibration for wireless charging starts below with reference to FIG. 2.

In this regard, FIG. 1A is an exemplary illustration of a Li-ion battery charging profile 10. As is well known in the industry, a Li-ion battery (not shown) has strict requirements on charging voltage and charging current because Li-ion cells (not shown) in the Li-ion battery cannot accept overcharge. In this regard, the Li-ion battery can only take what it can absorb. Anything extra can cause stress and even permanent damage to the Li-ion battery.

When the Li-ion battery is connected to a charging source (not shown) at time $T_0$, the Li-ion battery is in a constant current stage 12, in which charging voltage (referenced in drawings as V) rises while charging current (referenced in drawings as I) remains constant. As such, an effective charging power (referenced in drawings as $P_{EFF}$) ($P_{EFF}=V\times I$) increases as a result of the charging voltage increase, thus enabling fast charging of the Li-ion battery. At time $T_1$, the Li-ion battery is in a saturation charge stage 14, in which the charging voltage peaks and levels off while the charging current starts to decline. As such, the effective charging power decreases as a result of the charging current decline. At time $T_2$, the Li-ion battery is in a ready stage 16, wherein the Li-ion battery is charged to a desired voltage level and the charging current drops to zero (0). In this regard, the effective charging power also drops to zero (0) to prevent overcharging damage to the Li-ion battery. At time $T_3$, the Li-ion battery is in a standby stage 18, in which the charging current may be applied occasionally to top the Li-ion battery up to the desired voltage level.

FIG. 1B is a capacity-voltage curve 20 providing an exemplary illustration of a Li-ion battery capacity as a function of the charging voltage and the charging current of FIG. 1A. The capacity-voltage curve 20 comprises a capacity curve 22, a charging voltage curve 24, and a charging current curve 26. When the Li-ion battery is connected to the charging source, the charging voltage curve 24 shoots up quickly. In this regard, the Li-ion battery is in the constant current stage 12 according to the Li-ion battery charging profile 10 of FIG. 1A. As the capacity curve 22 gradually peaks, the charging current curve 26 declines quickly and the charging voltage curve 24 levels off. In this regard, the Li-ion battery is in the saturation charge stage 14 according to the Li-ion battery charging profile 10. Since the Li-ion battery cannot accept overcharge, the charging current must be cut off. A continuous trickle charge (maintenance charge) would cause plating of metallic lithium, thus compromising safety of the Li-ion battery. Hence, according to the Li-ion battery charging profile 10 and the capacity-voltage curve 20, the effective charging power increases when the Li-ion battery is in the constant current stage 12 and decreases when the Li-ion battery is in the saturation charge stage 14 to ensure fast charging and protect the Li-ion battery from overcharging damage.

The Li-ion battery has become increasingly popular in battery-operated electronic devices, such as smartphones, tablets, and portable computers, due to many advantages over traditional batteries (e.g., nickel-cadmium batteries). For example, the Li-ion battery has higher power density, produces less self-discharge, and requires lower maintenance to prolong battery life than the traditional batteries. Concurrent to the prevalence of Li-ion battery technology, wireless charging is also gaining traction in the wireless communication industry and may one day replace charging plugs and wires, similar to how Bluetooth™ and wireless-fidelity (Wi-Fi) have eliminated communication cables (e.g., Ethernet cables) in peer-to-peer and peer-to-multi-peer communications.

Figure 2:
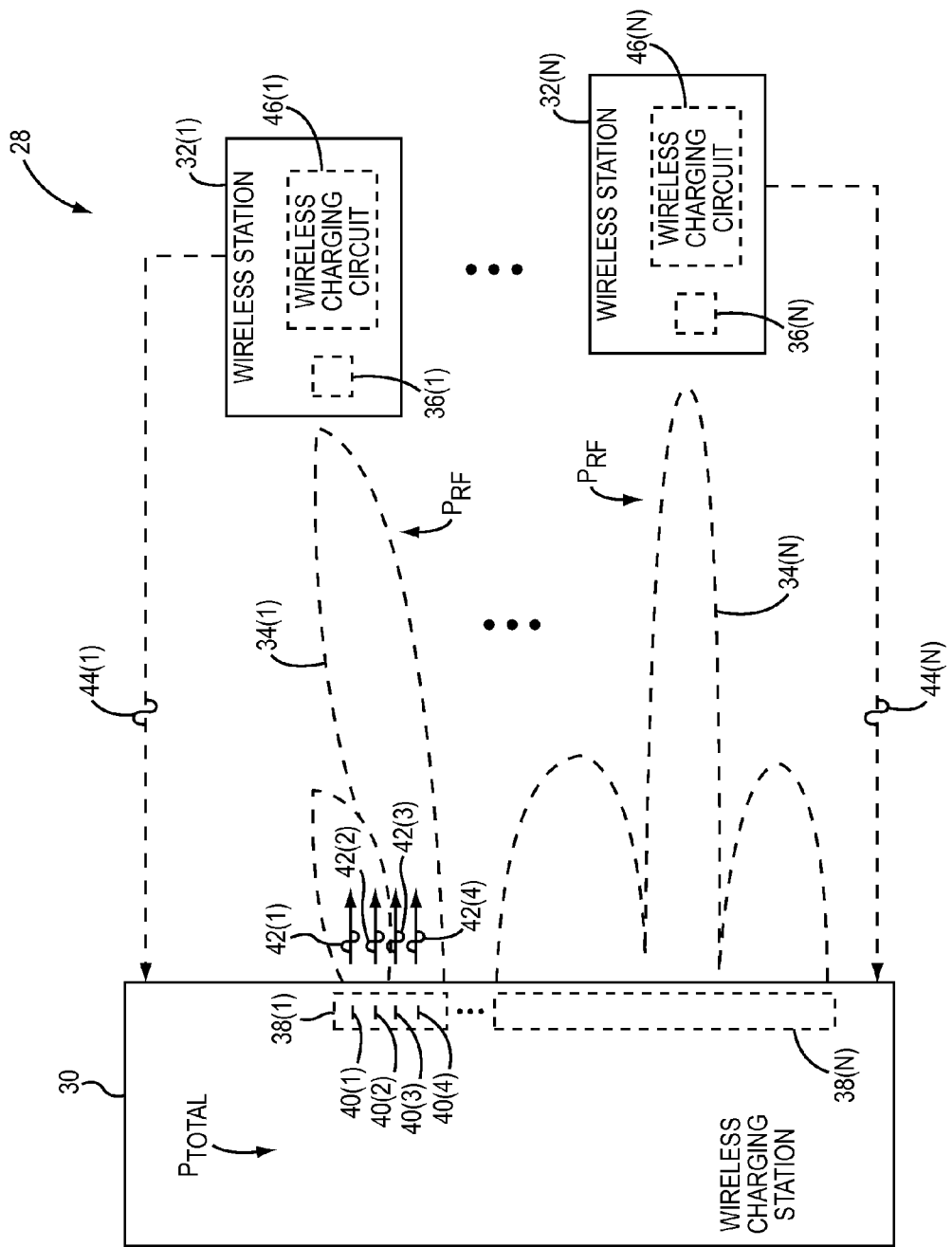
FIG. 2 is a schematic diagram of an exemplary wireless charging system, in which a wireless charging station is configured to charge one or more wireless stations via one or more respective wireless radio frequency (RF) charging signals.

In this regard, FIG. 2 is a schematic diagram of an exemplary wireless charging system 28, wherein a wireless charging station 30 is configured to charge one or more wireless stations 32(1)-32(N) via one or more respective wireless RF charging signals 34(1)-34(N). The one or more wireless stations 32(1)-32(N) include one or more respective batteries 36(1)-36(N). In a non-limiting example, the one or more batteries 36(1)-36(N) are Li-ion batteries. In this regard, the Li-ion battery charging profile 10 of FIG. 1A and the capacity-voltage curve 20 of FIG. 1B are applicable when charging the one or more batteries 36(1)-36(N) in the wireless charging system 28. In another non-limiting example, the one or more wireless RF charging signals 34(1)-34(N) are provided on an industrial, scientific, and medical (ISM) band that may operate in nine hundred fifteen megahertz (915 MHz), twenty-four hundred megahertz (2400 MHz), fifty-eight hundred megahertz (5800 MHz), or twenty-four gigahertz (24 GHz) RF spectrums.

The wireless charging station 30 has a total available power (referenced in drawings as $P_{TOTAL}$), which must be set below a maximum power (not shown) that is set by regulatory authorities such as the Federal Communications Commission (FCC) in the United States. The total available power is shared among the one or more wireless stations 32(1)-32(N). The wireless charging station 30 dynamically determines how the total available power is distributed among the one or more wireless stations 32(1)-32(N). In this regard, the more wireless stations that are in the wireless charging system 28, the smaller share of the total available power each wireless station will receive.

With continuing reference to FIG. 2, the wireless charging station 30 includes a plurality of antenna elements (not shown). In a non-limiting example, the wireless charging station 30 can have in excess of ten thousand (10,000) antenna elements. The plurality of antenna elements in the wireless charging station 30 may be further configured to form one or more antenna arrays 38(1)-38(N), in which each of the one or more antenna arrays 38(1)-38(N) includes at least two antenna elements among the plurality of antenna elements of the wireless charging station 30. The one or more antenna arrays 38(1)-38(N) are configured to transmit the one more wireless RF charging signals 34(1)-34(N) to the one or more wireless stations 32(1)-32(N), respectively. To illustrate the configuration and operation of the wireless charging system 28, wireless station 32(1), wireless RF charging signal 34(1), and antenna array 38(1) are discussed as a non-limiting example. It should be understood that the configuration and operation discussed herein are applicable to the one or more antenna arrays 38(1)-38(N), the one or more wireless RF charging signals 34(1)-34(N), and the one or more wireless stations 32(1)-32(N) as well.

If, for example, the antenna array 38(1) includes four antenna elements 40(1)-40(4), the wireless RF charging signal 34(1) will include four RF signals 42(1)-42(4) transmitted from the four antenna elements 40(1)-40(4), respectively. In this regard, the wireless RF charging signal 34(1) is a beamformed wireless RF charging signal. Beamforming is a modern wireless signal transmission scheme, in which multiple wireless signals, such as the four RF signals 42(1)-42(4), are transmitted simultaneously toward a single wireless receiver. If phases of the multiple wireless signals are coherent, the wireless receiver will be able to linearly combine the multiple wireless signals for improved signal strength and power gain.

Since the four RF signals 42(1)-42(4) may arrive at the wireless station 32(1) through different paths, the four antenna elements 40(1)-40(4) in the antenna array 38(1) are calibrated to ensure phase coherence when the four RF signals 42(1)-42(4) arrive at the wireless station 32(1). By having the phase coherence among the four RF signals 42(1)-42(4), a total RF power (referenced in drawings as $P_{RF}$) of the wireless RF charging signal 34(1) can be linearly controlled by adjusting individual RF power of the four RF signals 42(1)-42(N). Hence, the total RF power of the wireless RF charging signal 34(1) can be maximized.

If the antenna array 38(1) and the wireless station 32(1) are disposed in a line-of-sight (LOS) arrangement, transmitter phases and amplitudes of the four RF signals 42(1)-42(4) can be estimated based on a training signal (not shown) provided by the wireless station 32(1) under the assumption that the training signal would have a high degree of phase correlation with the wireless RF charging signal 34(1). However, this may not always be the case in the wireless charging system 28 because the antenna array 38(1) and the wireless station 32(1) may not always be disposed in the LOS arrangement. When the antenna array 38(1) and the wireless station 32(1) are not disposed in the LOS arrangement, the estimated transmitter phases and amplitudes based on the training signal may be inaccurate. As a result, it may be more difficult to preserve phase coherence among the four RF signals 42(1)-42(4) and control the total RF power in the wireless RF charging signal 34(1). Consequently, it is also difficult for the wireless charging station 30 to control the effective charging power according to the Li-ion battery charging profile 10 of FIG. 1A since the effective charging power is proportionally related to the total RF power. In this regard, one or more feedback signals 44(1)-44(N) are provided by one or more wireless charging circuits 46(1)-46(N) in the one or more wireless stations 32(1)-32(N), respectively, to help calibrate the one or more antenna arrays 38(1)-38(N) in the wireless charging station 30. The one or more feedback signals 44(1)-44(N) indicate total RF power received by the one or more wireless stations 32(1)-32(N), respectively.

For example, feedback signal 44(1) provided by the wireless station 32(1) indicates a total RF power received from the four RF signals 42(1)-42(4). Based on the feedback signal 44(1), the wireless charging station 30 can continuously or periodically adjust transmitter phases of the four antenna elements 40(1)-40(4) until the feedback signal 44(1) indicates that the total RF power received from the four antenna elements 40(1)-40(4) has maximized.

As mentioned earlier, if phases of the multiple wireless signals, such as the four RF signals 42(1)-42(4) transmitted by the antenna array 38(1), are coherent, the wireless receiver at the wireless station 32(1) will be able to linearly combine the multiple wireless signals for improved signal strength and power gain. To further illustrate how the wireless charging station 30 may be configured to transmit coherently the one more wireless RF charging signals 34(1)-34(N), FIG. 3 is a schematic diagram of an exemplary wireless charging station 48 including a plurality of antenna elements 50(1)-50(M) that may be calibrated to achieve phase coherency when transmitting the one or more wireless RF charging signals 34(1)-34(N) of FIG. 2.

Figure 3:
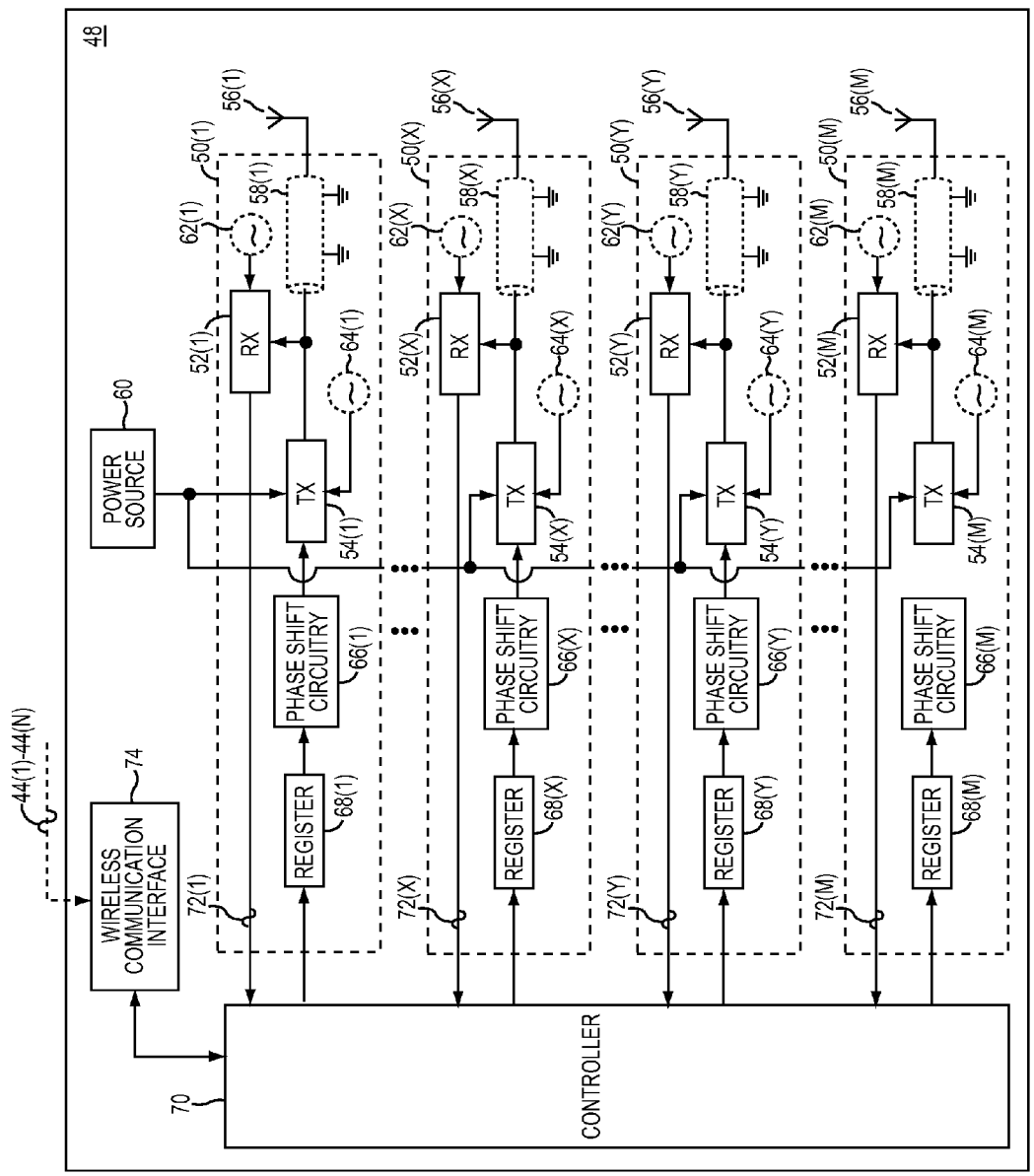
FIG. 3 is a schematic diagram of an exemplary wireless charging station including a plurality of antenna elements that may be calibrated to achieve phase coherency when transmitting the one or more wireless RF charging signals of FIG. 2.

With reference to FIG. 3, the plurality of antenna elements 50(1)-50(M) respectively include a plurality of receivers 52(1)-52(M) and a plurality of transmitters 54(1)-54(M). The plurality of receivers 52(1)-52(M) and the plurality of transmitters 54(1)-54(M) are respectively coupled to a plurality of antennas 56(1)-56(M) via a plurality of signal paths 58(1)-58(M). In a non-limiting example, the plurality of signal paths 58(1)-58(M) may be provided as coaxial cables. The plurality of transmitters 54(1)-54(M) may be powered by a power source 60. The plurality of receivers 52(1)-52(M) is coupled to a plurality of receiver oscillators 62(1)-62(M) that determines operation frequency of the plurality of receivers 52(1)-52(M), respectively. The plurality of transmitters 54(1)-54(M) is coupled to a plurality of transmitter oscillators 64(1)-64(M) that determines operation frequency of the plurality of transmitters 54(1)-54(M), respectively.

The plurality of antenna elements 50(1)-50(M) comprises a plurality of phase shift circuitries 66(1)-66(M), respectively. The plurality of phase shift circuitries 66(1)-66(M) is coupled to the plurality of transmitters 54(1)-54(M) and configured to adjust transmitter phases of the plurality of transmitters 54(1)-54(M), respectively. The plurality of antenna elements 50(1)-50(M) also comprises a plurality of registers 68(1)-68(M), respectively. The plurality of registers 68(1)-68(M) is coupled to the plurality of phase shift circuitries 66(1)-66(M) and configured to store the transmitter phases of the plurality of transmitters 54(1)-54(M), respectively, after being adjusted by the plurality of phase shift circuitries 66(1)-66(M).

The wireless charging station 48 comprises a controller 70 coupled to the plurality of receivers 52(1)-52(M) and the plurality of transmitters 54(1)-54(M). As is further discussed later with reference to FIG. 4, the controller 70 is configured to collect a plurality of feedback information 72(1)-72(M) from the plurality of receivers 52(1)-52(M), respectively. The controller 70 then controls the plurality of phase shift circuitries 66(1)-66(M) to adjust the transmitter phases of the plurality of transmitters 54(1)-54(M) based on the plurality of feedback information 72(1)-72(M), respectively.

The wireless charging station 48 also comprises a wireless communication interface 74, which may be configured to receive the one or more feedback signals 44(1)-44(N) of FIG. 2. In a non-limiting example, the wireless communication interface 74 may be configured to operate based on Wi-Fi, Bluetooth, Bluetooth Low Energy (BLE), and ZigBee communication protocols.

When the wireless charging station 48 is powered on, the transmitter phases of the plurality of antenna elements 50(1)-50(M) may be out of alignment and become incoherent because relative phases of the plurality of transmitter oscillators 64(1)-64(M) may be randomized at the power on event. Furthermore, impedance variations among the plurality of signal paths 58(1)-58(M) may also cause the plurality of antenna elements 50(1)-50(M) to lose phase coherency during transmission. As such, it is necessary to calibrate the plurality of antenna elements 50(1)-50(M) to ensure phase coherency after power-up of the wireless charging station 48.

With reference back to FIG. 2, the one or more feedback signals 44(1)-44(N) indicate the total RF power received by the one or more wireless stations 32(1)-32(N), respectively. As such, the one or more feedback signals 44(1)-44(N) can be used to calibrate the one or more antenna arrays 38(1)-38(N), respectively. In this regard, FIG. 4 is a schematic diagram of an exemplary wireless charging system 76 configured to achieve phase coherency among the plurality of antenna elements 50(1)-50(M) based on a feedback signal 78 received from a wireless charging device 80.

Figure 4:
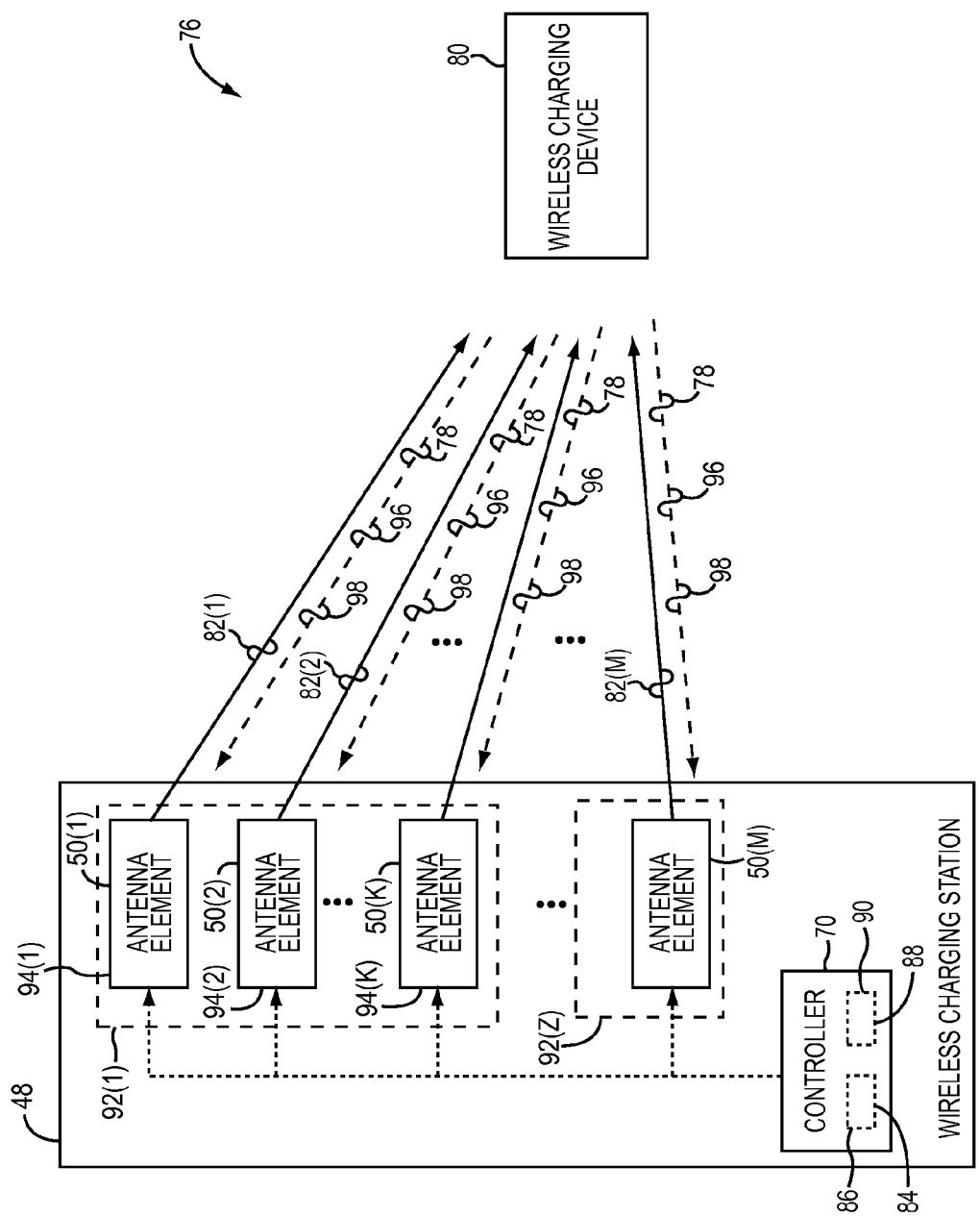
FIG. 4 is a schematic diagram of an exemplary wireless charging system configured to achieve phase coherency among a plurality of antenna elements based on a feedback signal received from a wireless charging device.

With reference to FIG. 4, the controller 70 instructs the plurality of antenna elements 50(1)-50(M) in the wireless charging station 48 to respectively transmit a plurality of wireless RF charging signals 82(1)-82(M) to the wireless charging device 80. The wireless charging device 80 measures a total RF power received from a plurality of wireless RF charging signals 82(1)-82(M) and provides the measured total RF power to the wireless charging station 48 in the feedback signal 78. In this regard, the controller 70 in the wireless charging station 48 can continuously monitor the feedback signal 78 and adjust transmitter phases of the plurality of antenna elements 50(1)-50(M) accordingly until the feedback signal 78 indicates that the total RF power in the plurality of wireless RF charging signals 82(1)-82(M) has maximized.

In a non-limiting example, the controller 70 may adjust the transmitter phases of the plurality of antenna elements 50(1)-50(M) one antenna element at a time. In this regard, the controller 70 selects an antenna element, for example, antenna element 50(1), from the plurality of antenna elements 50(1)-50(M). In a first step, the controller 70 may record the total RF power indicated in the feedback signal 78 as a first power parameter 84 in a first register 86. The controller 70 then adjusts transmitter phase of the antenna element 50(1) by a specified phase degree. In a non-limiting example, the controller 70 may increase the transmitter phase of the antenna element 50(1) if the specified phase degree is positive. In contrast, the controller 70 may decrease the transmitter phase of the antenna element 50(1) if the specified phase degree is negative. In response to adjusting the transmitter phase of the antenna element 50(1), the controller 70 receives the feedback signal 78 that indicates the total RF power received from the plurality of wireless RF charging signals 82(1)-82(M). The controller 70 may record the total RF power indicated in the feedback signal 78 as a second power parameter 88 in a second register 90. While the second power parameter 88 is greater than the first power parameter 84, the controller 70 records the second power parameter 88 as the first power parameter 84, adjusts the transmitter phase of the antenna element 50(1) by the specified phase degree, and records the total RF power indicated by the feedback signal 78 as the second power parameter 88 in the second register 90. In this regard, the controller 70 exits the first step and proceeds to a second step as soon as the second power parameter 88 becomes less than or equal to the first power parameter 84.

In the second step, the controller 70 inverts the specified phase degree and then divides the inverted specified phase degree by a predefined step value. In a non-limiting example, the predefined step value may be decimal two (2). For example, if the specified phase degree used in the first step is five degrees (5°) and the predefined step value is 2, the specified phase degree used to start the second step will be negative two and half degrees (−2.5°). While the specified phase degree is greater than a predefined phase degree threshold, the controller 70 records the second power parameter 88 as the first power parameter 84, adjusts the transmitter phase of the antenna element 50(1) by the specified phase degree, and records the total RF power indicated by the feedback signal 78 as the second power parameter 88. While the second power parameter 88 is greater than the first power parameter 84, the controller 70 records the second power parameter 88 as the first power parameter 84, adjusts the transmitter phase of the antenna element 50(1) by the specified phase degree, and records the total RF power indicated in the feedback signal 78 as the second power parameter 88. When the second power parameter 88 becomes less than or equal to the first power parameter 84, the controller 70 again inverts the specified phase degree and divides the inverted specified phase degree by the predefined step value. For example, by inverting and dividing the specified phase degree of −2.5° that was used to start the second step, the specified phase degree to be used next is one and one-quarter degree (1.25°). The controller 70 exits the second step when the specified phase degree is less than or equal to the predefined phase degree threshold.

The controller 70 then selects another antenna element, for example, antenna element 50(2), from the plurality of antenna elements 50(1)-50(M) and repeats the first step and the second step. By the time the controller 70 has performed the first step and the second step for each of the plurality of antenna elements 50(1)-50(M), the plurality of antenna elements 50(1)-50(M) is in phase coherency.

Alternative to adjusting the respective transmitter phases of the plurality of antenna elements 50(1)-50(M) individually, it is also possible to organize the plurality of antenna elements 50(1)-50(M) into one or more antenna element clusters 92(1)-92(Z). Each of the one or more antenna element clusters 92(1)-92(Z) may include one or more antenna elements 94(1)-94(K) selected from the plurality of antenna elements 50(1)-50(M). In this regard, the controller 70 adjusts transmitter phases of the one or more antenna elements 94(1)-94(K) in each of the one or more antenna element clusters 92(1)-92(Z) one antenna element cluster at a time. Accordingly, the controller 70 selects an antenna element cluster, for example, antenna element cluster 92(1), from the one or more antenna element clusters 92(1)-92(Z) and repeats the first step and the second step as described below.

In the first step, the controller 70 may record the total RF power indicated in the feedback signal 78 as the first power parameter 84 in the first register 86. The controller 70 then adjusts the transmitter phases of the one or more antenna elements 94(1)-94(K) by a specified phase degree. The controller 70 receives the feedback signal 78 and records the total RF power indicated in the feedback signal 78 as the second power parameter 88. While the second power parameter 88 is greater than the first power parameter 84, the controller 70 records the second power parameter 88 as the first power parameter 84, adjusts the transmitter phases of the one or more antenna elements 94(1)-94(K) by the specified phase degree, and records the total RF power indicated by the feedback signal 78 as the second power parameter 88. The controller 70 exits the first step and proceeds to the second step as soon as the second power parameter 88 becomes less than or equal to the first power parameter 84.

In the second step, the controller 70 first inverts the specified phase degree and then divides the inverted specified phase degree by the predefined step value. While the specified phase degree is greater than the predefined phase degree threshold, the controller 70 records the second power parameter 88 as the first power parameter 84, adjusts the transmitter phases of the one or more antenna elements 94(1)-94(K) by the specified phase degree, and records the total RF power indicated by the feedback signal 78 as the second power parameter 88. While the second power parameter 88 is greater than the first power parameter 84, the controller 70 records the second power parameter 88 as the first power parameter 84, adjusts the transmitter phases of the one or more antenna elements 94(1)-94(K) by the specified phase degree, and records the total RF power indicated in the feedback signal 78 as the second power parameter 88. When the second power parameter 88 becomes less than or equal to the first power parameter 84, the controller 70 again inverts the specified phase degree and divides the inverted specified phase degree by the predefined step value. The controller 70 exits the second step when the specified phase degree is less than or equal to the predefined phase degree threshold.

The controller 70 then selects a next antenna element cluster from the one or more antenna element clusters 92(1)-92(Z) and repeats the first step and the second step as described above until all of the one or more antenna element clusters 92(1)-92(Z) are calibrated to be phase coherent.

To further reduce the time required to adjust the respective transmitter phases of the plurality of antenna elements 50(1)-50(M), it is possible to initialize the respective transmitter phases of the plurality of antenna elements 50(1)-50(M) based on a training signal 96 transmitted by the wireless charging device 80. In this regard, the controller 70 measures a phase of the training signal 96 received by each of the plurality of antenna elements 50(1)-50(M). The controller 70 then inverts the phase of the training signal 96 and initializes the transmitter phases of the plurality of antenna elements 50(1)-50(M) to the inverted phase of the training signal 96.

The feedback signal 78 is communicated from the wireless charging device 80 to the wireless charging station 48 in one of the ISM bands. The training signal 96 is communication in the same band, but in reversion direction, as the plurality of wireless RF charging signals 82(1)-82(M). In a non-limiting example, the feedback signal 78 may be communicated based on Wi-Fi, Bluetooth, BLE, and ZigBee communication protocols. In another non-limiting example, the feedback signal 78 and the training signal 96 may be multiplexed or combined into a combined signal 98 and transmitted in the same band as the plurality of wireless RF charging signals 82(1)-82(M). In another non-limiting example, the feedback signal 78 and the training signal 96 may be the same signal.

Figure 5:
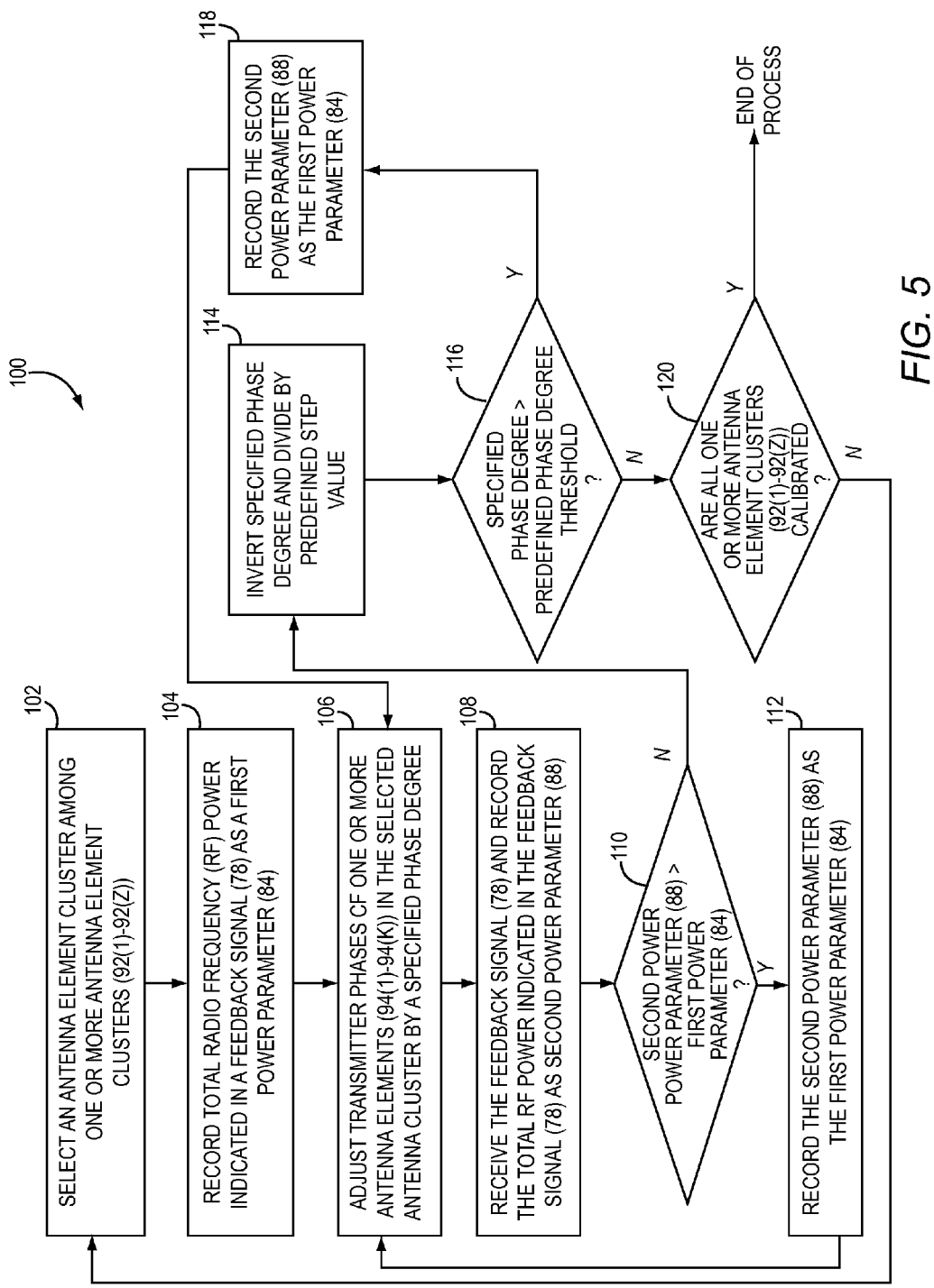
FIG. 5 is a flowchart of an exemplary antenna element calibration process for calibrating one or more antenna element clusters based on the feedback signal of FIG. 4.

FIG. 5 is a flowchart of an exemplary antenna element calibration process 100 for calibrating the one or more antenna element clusters 92(1)-92(Z) of FIG. 4 based on the feedback signal 78.

According to the antenna element calibration process 100, the controller 70 first selects an antenna element cluster from the one or more antenna element clusters 92(1)-92(Z) (block 102). The controller 70 records the total RF power indicated in the feedback signal 78 as the first power parameter 84 in the first register 86 (block 104). The controller 70 then adjusts the transmitter phases of the one or more antenna elements 94(1)-94(K) in the selected antenna element cluster by the specified phase degree (block 106). In response to adjusting the transmitter phases of the one or more antenna elements 94(1)-94(K), the controller 70 receives the feedback signal 78 and records the total RF power indicated in the feedback signal 78 as the second power parameter 88 (block 108). The controller 70 then checks if the second power parameter 88 is greater than the first power parameter 84 (block 110). If the second power parameter 88 is greater than the first power parameter 84, the controller 70 records the second power parameter 88 as the first power parameter 84 and returns to block 106 (block 112). If the second power parameter 88 is less than or equal to the first power parameter 84, the controller inverts the specified phase degree and then divides the inverted specified phase degree by the predefined step value (block 114). The controller 70 then compares the specified phase degree against the predefined phase degree threshold (block 116). If the specified phase degree is greater than the predefined phase degree threshold, the controller 70 records the second power parameter 88 as the first power parameter 84 and returns to block 106 (block 118). If, however, the specified phase degree is less than or equal to the predefined phase degree threshold, the controller 70 determines whether all the one or more antenna element clusters 92(1)-92(Z) are calibrated (block 120). The antenna element calibration process 100 ends when all the one or more antenna element clusters 92(1)-92(Z) are calibrated. Otherwise, the controller 70 returns to block 106.

Those skilled in the art will recognize improvements and modifications to the embodiments of the present disclosure. All such improvements and modifications are considered within the scope of the concepts disclosed herein and the claims that follow.

What is claimed is:
1. A wireless charging system, comprising:
a wireless charging station comprising:

a plurality of antenna elements configured to transmit a plurality of wireless radio frequency (RF) charging signals, respectively; and a controller coupled to the plurality of antenna elements;

a wireless charging device configured to communicate a feedback signal to the wireless charging station, wherein the feedback signal indicates a total RF power received by the wireless charging device in the plurality of wireless RF charging signals; and for each antenna element among the plurality of antenna elements in the wireless charging station, the controller is configured to:

record the total RF power indicated in the feedback signal as a first power parameter;

adjust a transmitter phase of the antenna element by a specified phase degree;

receive the feedback signal from the wireless charging device and record the total RF power indicated by the feedback signal as a second power parameter; and while the second power parameter is greater than the first power parameter:

record the second power parameter as the first power parameter;

adjust the transmitter phase of the antenna element by the specified phase degree; and receive the feedback signal from the wireless charging device and record the total RF power indicated by the feedback signal as the second power parameter.

2. The wireless charging system of claim 1 wherein the controller is further configured to:

while the second power parameter is less than or equal to the first power parameter:

invert the specified phase degree and divide the inverted specified phase degree by a predefined step value;

record the second power parameter as the first power parameter; and while the specified phase degree is greater than a predefined phase degree threshold:

record the second power parameter as the first power parameter;

adjust the transmitter phase of the antenna element by the specified phase degree;

receive the feedback signal from the wireless charging device and record the total RF power indicated by the feedback signal as the second power parameter; and while the second power parameter is greater than the first power parameter:

record the second power parameter as the first power parameter;

adjust the transmitter phase of the antenna element by the specified phase degree; and receive the feedback signal from the wireless charging device and record the total RF power indicated by the feedback signal as the second power parameter.

3. The wireless charging system of claim 2 wherein the predefined step value is decimal two (2).

4. The wireless charging system of claim 1 wherein:

the plurality of antenna elements is organized into one or more antenna element clusters each comprising one or more antenna elements selected from the plurality of antenna elements; and for each antenna element cluster among the one or more antenna element clusters, the controller is configured to:

receive the feedback signal from the wireless charging device and record the total RF power indicated by the feedback signal as the first power parameter;

adjust transmitter phases of the one or more antenna elements by the specified phase degree;

receive the feedback signal from the wireless charging device and record the total RF power indicated by the feedback signal as the second power parameter; and while the second power parameter is greater than the first power parameter:

record the second power parameter as the first power parameter;

adjust the transmitter phases of the one or more antenna elements by the specified phase degree; and receive the feedback signal from the wireless charging device and record the total RF power indicated by the feedback signal as the second power parameter.

5. The wireless charging system of claim 4 wherein the controller is further configured to:

while the second power parameter is less than or equal to the first power parameter:

invert the specified phase degree and divide the inverted specified phase degree by a predefined step value;

record the second power parameter as the first power parameter; and while the specified phase degree is greater than a predefined phase degree threshold:

record the second power parameter as the first power parameter;

adjust the transmitter phase of the antenna element by the specified phase degree;

receive the feedback signal from the wireless charging device and record the total RF power indicated by the feedback signal as the second power parameter; and while the second power parameter is greater than the first power parameter:

record the second power parameter as the first power parameter;

adjust the transmitter phases of the one or more antenna elements by the specified phase degree; and receive the feedback signal from the wireless charging device and record the total RF power indicated by the feedback signal as the second power parameter.

6. The wireless charging system of claim 5 wherein the predefined step value is decimal two (2).

7. The wireless charging system of claim 1 wherein the controller is further configured to continuously adjust the transmitter phase of the antenna element by the specified phase degree.

8. The wireless charging system of claim 1 wherein the controller is further configured to periodically adjust the transmitter phase of the antenna element by the specified phase degree.

9. The wireless charging system of claim 1 wherein the controller in the wireless charging station is further configured to adjust amplitude of the antenna element concurrently to adjusting the transmitter phase of the antenna element by the specified phase degree.

10. The wireless charging system of claim 1 wherein the controller in the wireless charging station is further configured to:
  receive a training signal from the wireless charging device; and
  for each of the plurality of antenna elements:
    measure a phase of the training signal received by the antenna element;
    invert the phase of the training signal; and
    initialize the transmitter phase of the antenna element to the inverted phase of the training signal.

11. The wireless charging system of claim 10 wherein the controller in the wireless charging station is configured to receive the training signal from the wireless charging device in the same RF band as the plurality of wireless RF charging signals.

12. The wireless charging system of claim 10 wherein the controller in the wireless charging station is configured to receive the feedback signal from the wireless charging device in one of the industrial, scientific, and medical (ISM) bands.

13. The wireless charging system of claim 12 wherein the controller in the wireless charging station is configured to receive the feedback signal based on wireless-fidelity (Wi-Fi), Bluetooth, Bluetooth Low Energy (BLE), or ZigBee communication protocols.

14. A method for calibrating a plurality of antenna elements in a wireless charging station, comprising:
  transmitting a plurality of wireless radio frequency (RF) charging signals from a plurality of antenna elements;
  communicating a feedback signal that indicates a total RF power received in the plurality of wireless RF charging signals; and
  for each antenna element among the plurality of antenna elements in a wireless charging station:
    receiving the feedback signal from a wireless charging device and recording the total RF power indicated by the feedback signal as a first power parameter;
    adjusting a transmitter phase of the antenna element by a specified phase degree;
    receiving the feedback signal from the wireless charging device and recording the total RF power indicated by the feedback signal as a second power parameter; and
    while the second power parameter is greater than the first power parameter:
      recording the second power parameter as the first power parameter;
      adjusting the transmitter phase of the antenna element by the specified phase degree; and
      receiving the feedback signal from the wireless charging device and recording the total RF power indicated by the feedback signal as the second power parameter.

15. The method of claim 14 further comprising:
  while the second power parameter is less than or equal to the first power parameter:
    inverting the specified phase degree and dividing the inverted specified phase degree by a predefined step value;
    recording the second power parameter as the first power parameter; and
    while the specified phase degree is greater than a predefined phase degree threshold:
      recording the second power parameter as the first power parameter;
      adjusting the transmitter phase of the antenna element by the specified phase degree;
      receiving the feedback signal from the wireless charging device and recording the total RF power indicated by the feedback signal as the second power parameter; and
      while the second power parameter is greater than the first power parameter:
        recording the second power parameter as the first power parameter;
        adjusting the transmitter phase of the antenna element by the specified phase degree; and
        receiving the feedback signal from the wireless charging device and recording the total RF power indicated by the feedback signal as the second power parameter.

16. The method of claim 15 further comprising dividing the inverted specified phase degree by decimal two (2).

17. The method of claim 14 further comprising:
  organizing the plurality of antenna elements into one or more antenna element clusters each comprising one or more antenna elements selected from the plurality of antenna elements; and
  for each antenna element cluster among the one or more antenna element clusters:
    receiving the feedback signal from the wireless charging device and recording the total RF power indicated by the feedback signal as the first power parameter;
    adjusting transmitter phases of the one or more antenna elements by the specified phase degree;
    receiving the feedback signal from the wireless charging device and recording the total RF power indicated by the feedback signal as the second power parameter; and
    while the second power parameter is greater than the first power parameter:
      recording the second power parameter as the first power parameter;
      adjusting the transmitter phases of the one or more antenna elements by the specified phase degree; and
      receiving the feedback signal from the wireless charging device and recording the total RF power indicated by the feedback signal as the second power parameter.

18. The method of claim 17 further comprising:
  while the second power parameter is less than or equal to the first power parameter:
    inverting the specified phase degree and dividing the inverted specified phase degree by a predefined step value;
    recording the second power parameter as the first power parameter; and
    while the specified phase degree is greater than a predefined phase degree threshold:
      recording the second power parameter as the first power parameter;
      adjusting the transmitter phases of the one or more antenna elements by the specified phase degree;
      receiving the feedback signal from the wireless charging device and recording the total RF power indicated by the feedback signal as the second power parameter; and while the second power parameter is greater than the first power parameter:
    recording the second power parameter as the first power parameter;
    adjusting the transmitter phases of the one or more antenna elements by the specified phase degree; and
    receiving the feedback signal from the wireless charging device and recording the total RF power indicated by the feedback signal as the second power parameter.

19. The method of claim 18 further comprising dividing the inverted specified phase degree by decimal two (2).

20. The method of claim 14 further comprising:
receiving a training signal from the wireless charging device; and
for each of the plurality of antenna elements:
    measuring a phase of the training signal received by the antenna element;
    inverting the phase of the training signal; and
    initializing the transmitter phase of the antenna element to the inverted phase of the training signal.

\* \* \* \* \*